United States Patent [19]
Habegger et al.

[11] Patent Number: 6,026,076
[45] Date of Patent: Feb. 15, 2000

[54] DETECTING DIGITAL MULTIPLEXER FAULTS

[75] Inventors: Kenneth Leon Habegger; Karen Louise Moeller, both of Naperville; Ronald Keith Poole; Jaime E. Salazar, both of Warrenville; Mark Roman Sosinski, Downers Grove; Richard Grant Sparber, Wheaton, all of Ill.

[73] Assignee: Lucent Technologies Inc., Murray Hill, N.J.

[21] Appl. No.: 08/920,993

[22] Filed: Aug. 29, 1997

[51] Int. Cl.[7] ............................. G01R 31/08; H04J 3/12
[52] U.S. Cl. ......................... 370/242; 370/522; 370/241
[58] Field of Search ..................................... 370/242, 241, 370/522, 524, 528, 535, 539, 541, 248, 249, 250, 542, 543, 217, 219, 220, 244, 536

[56] References Cited

U.S. PATENT DOCUMENTS 4,993,013  2/1991  Shinada et al. ..................... 370/242

*Primary Examiner*—Chi H. Pham
*Assistant Examiner*—Brenda H. Pham
*Attorney, Agent, or Firm*—Werner Ulrich

[57] ABSTRACT

Apparatus and a method for testing tiered digital multiplexing apparatus. To test a primary train of tiered demultiplexers, a data path assurance train of demultiplexers and a selector is used to generate a demultiplexed signal for comparison with a primary demultiplexed signal. To test a primary train of tiered multiplexers, the output of the final multiplexing stage is connected to the input of the data path assurance train of demultiplexers to generate a demultiplexed signal for comparison with a primary input signal to the primary multiplexer train. Advantageously, a simpler, more reliable, and less expensive data path assurance circuit using the same types of components as the primary multiplexers and demultiplexers can be used to detect failures in these primary units as well as the data path assurance circuit.

10 Claims, 3 Drawing Sheets

DETECTING DIGITAL MULTIPLEXER FAULTS

TECHNICAL FIELD

This invention relates to apparatus and methods for detecting faults in digital multiplexer/demultiplexer equipment, and distinguishing such faults from faults in the transmission facilities.

PROBLEM

Transmission facilities interconnect telecommunications switching systems. These transmission facilities are used to carry voice and other signals between the switching systems that are eventually connected to telecommunication terminals of the users.

In the past decade the most commonly used transmission facilities are those which carry digital signals. The digital signals represent digital data, directly generated, or they represent an analog signal which has been digitally encoded.

To carry these signals efficiently, individual speech signals which are normally encoded into a 64 kilobit (64K) per second channel are multiplexed into groups onto facilities which can carry many millions of bits per second. At this time one of the most commonly used digital signals is a DS3 signal which carries up to 672 voice channels.

A problem arising from the use of such high capacity digital facilities is that the multiplexers and the demultiplexers used for assembling and disassembling groups of voice channels have become critical to the reliability of the telecommunications network, especially since a fault in such systems can render up to 672 connections useless unless the fault is quickly detected and substitute equipment switched into place. A further and more difficult problem arises from the fact that a large portion of this multiplexing and demultiplexing equipment only affects a smaller number of voice channels and that the detection of such problems without the use of massive amounts of equipment is difficult.

Solution

The above problem is solved and an advance is made over the prior art in accordance with this invention wherein signals are multiplexed and demultiplexed into two parallel trains and wherein the signals of individual voice channels of the two trains are matched sequentially for all the channels of a multiplex group. In the case of an incoming signal, this signal passes through two parallel demultiplexers and the output of each channel is matched to insure that the two are identical. To test the operation of the outgoing multiplexers, the output of the final stage outgoing multiplexer is returned to the input of a parallel demultiplexer so that the individual channels of the outgoing signal may be compared with a multiplexed and demultiplexed version of that output signal. Advantageously, this allows individual channels to be checked at a sufficiently high rate to satisfy the requirements for fast trouble detection and also allows problems affecting groups of channels to be detected even more rapidly.

In accordance with applicants' preferred embodiment four levels of digital signals exist.

DS0, the 64K (base rate) single voice channel type of signal;

DS1, a signal carrying 24 DS0 signals;

DS2, a signal carrying 4 DS1 signals; and

DS3, a signal carrying 7 DS2 signals.

In accordance with the well known principles of digital multiplexing, each of the signals DS1, DS2, DS3 contains framing information to allow the signal to be multiplexed and demultiplexed into their constituent component signals.

Advantageously, applicants' arrangement allows for the use of standard multiplexer and demultiplexer parts in order to accomplish the trouble detection function.

DETAILED DESCRIPTION

Figure 1:
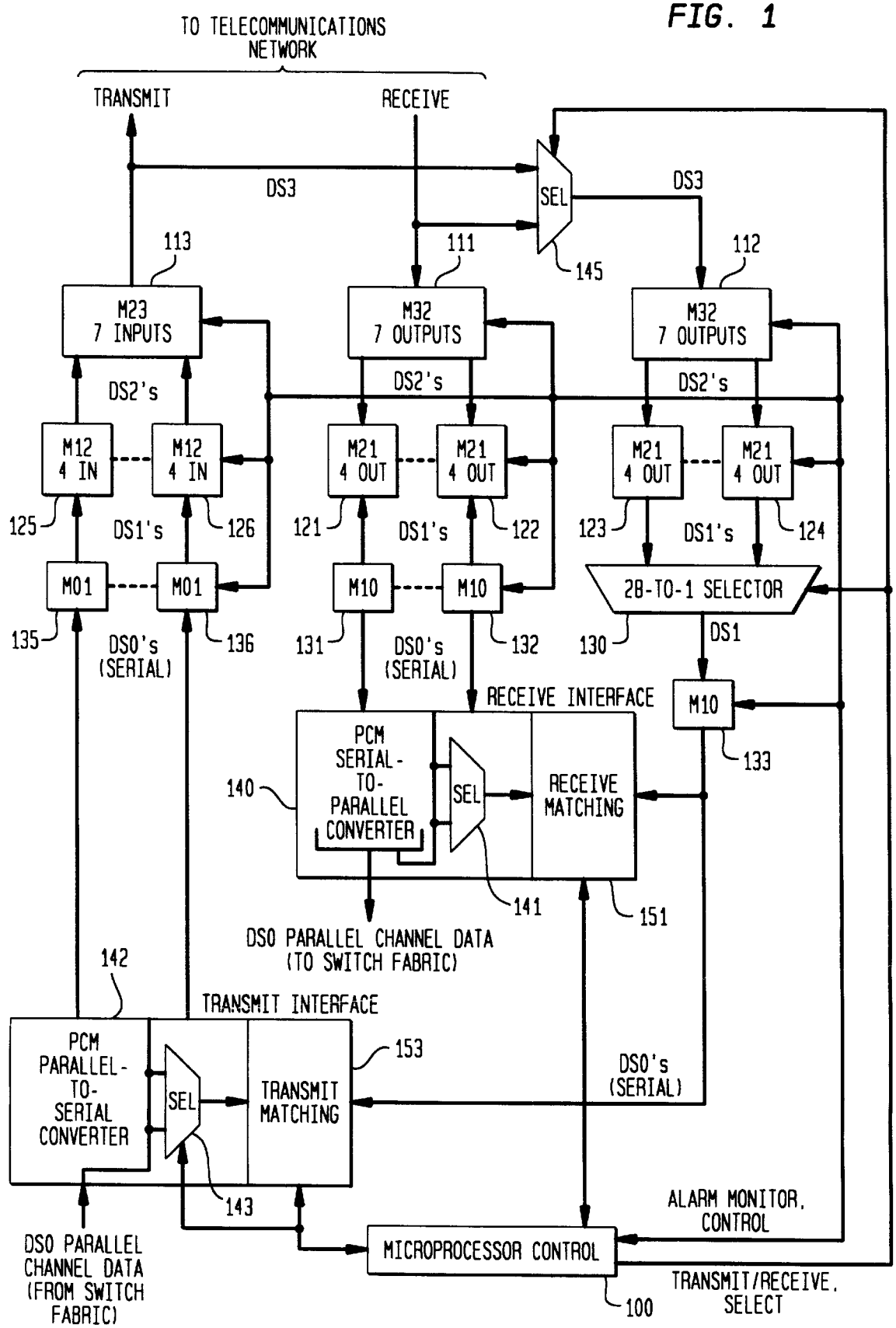
FIG. 1 is a block diagram illustrating applicants' invention.

FIG. 1 illustrates the basic operation of applicants' invention with respect to the detection of troubles in the circuitry for processing input signals. FIG. 1 also shows the principles for testing output multiplexers without showing in detail how the output multiplexing is performed.

The naming convention used herein is that M32, for example, is a demultiplexer with input signals at the DS3 level and output signals at the DS2 level. A demultiplexer has a higher initial number, while a multiplexer has a higher final number.

A DS3 input signal received from another digital communication switch or a digital cross-connect of a telecommunications network is sent in parallel to demultiplexers 111 and 112. The check demultiplexer 112 and the circuits fed by this unit are referred to herein as data path assurance (DPA) circuits. The circuits for processing live communication signals are referred to herein as primary circuits. Each of the demultiplexers 111 and 112 has 7 outputs, DS2 signals, which are transmitted to M21 demultiplexers, M21 (121, . . . , 122) for the primary side and M21 (123, . . . , 124) for the data path assurance (DPA) side. Each of the M21 demultiplexers (121, . . . , 122) produces four DS1 signals, each of which is transmitted to an M10 demultiplexer. Two such M10 demultiplexers are shown on each side: M21 121 feeds M10 131 and M21 122 feeds M10 132; on the other side, M21 123, . . . , and M21 124 all feed selector 130, which feeds a single M10 133. Each of the M10 demultiplexers 131, . . . , 132 carries a serial stream comprising 24 DS0 outputs. These M10 demultiplexers each convert one DS1 output of an M21 demultiplexer into a stream carrying 24 DS0 signals; the M10 searches for the framing bits from the input DS1 stream and generates a 24-channel bit stream having a separate framing pulse to indicate the start of a frame of 24 channels. The 24 channel serial outputs of M10 131, . . . , 132 are delivered to PCM In Serial-to-Parallel converter 140 prior to being delivered to a switch fabric, in this case, a time slot interchange (TSI) circuit. The outputs of M10 131, . . . , 132, after being converted from serial to parallel form, are also delivered to a selector 141 which selects a particular 24 channel bit stream to be examined.

The outputs of selector 141 and M10 133 are compared in receive matching circuit 151 which determines whether the 24 channel bit streams generated in the two demultiplexer trains are equal. If they are not, this is a sign of some trouble in one of the two demultiplexer groups and is an indication that a spare unit is to be substituted for this one.

In order to test the outgoing part of the multiplexer, i.e., the part which receives 24-channel bit streams from the switch fabrics and which generates the outgoing DS3 signal, a similar arrangement is used. In this case, a group of M01 multiplexers 135, . . . , 136 which receive 24 channel input streams from a PCM Out Parallel-to-Serial Converter 142 and converts these streams via M01 multiplexers into DS1 inputs to M12 multiplexers 125, ..., 126 which generate a group of DS2 signals that are used as the input to the final multiplexer M23 113 which generates a DS3 output signal. This output signal goes to other switches of the telecommunications network and also to selector 145 which selects between the DS3 input signal and the DS3 output signal for use as an input of M32 112, the highest stage demultiplexer of the DPA signal side. The signal that goes to demultiplexer M32 112 is then demultiplexed as previously described to generate the DS1 signal that is converted into a 24 channel bit stream and overhead data (e.g., framing pulses) by M10 133. The parallel channel data is sent to Parallel to Serial Converter 142 and thence to multiplexers M01 135, ..., M01 136, and is also sent to a selector 143 which selects the proper 24 channel byte-wise parallel bit stream for comparison in the transmission matching circuit 153 with the output of M10 133.

Microprocessor 100, which controls selectors 130, 141, 143 and 145 controls whether the transmit or receive side is being tested (selector 145), selects the 24 channel bit stream being matched on the transmit side (selector 143), the receive side (selector 141) and the data path assurance (DPA) unit (selector 130). The output of M10 133 should be identical to the selected 24 channel bit stream that forms an input to the M01 whose output DS1 signal is sent to M23 113. Match circuit 153, under the control of microprocessor 100 selects one of the 28 DS1 paths for matching.

Each of the demultiplexers M10, M21, M32, contain circuitry for detecting alarm conditions, and a register for recording alarm signals. Some of these alarms signals are passed from stage to stage in the demultiplexing processes and can simply be picked off the bit stream; others are detected locally in the demultiplexer circuits. These registers (not shown) can be read by the microprocessor 100. Contents of these registers can be used for making a decision to remove a unit from service.

Because frame alignment between the output selector 141, representing the active incoming pulse train, and M10 133, representing the matched pulse train, is not assured, multiple data frames (3 in applicants' preferred embodiment) from selector 141 are captured and compared in receive match circuit 151 with a single frame from M10 133; a match between any of the compared frames and the single frame provides high confidence that the operation of the unit is satisfactory.

One advantage of applicants' arrangements is that standard piece parts may be used to implement the checking circuitry. The DPA circuits use such standard piece parts. Checks can be made rapidly. The flexibility obtained by use of the microprocessor control permits signals generated by the different M21's and M12's to be checked more frequently than signals generated by the different M10's and M01's. Note also that while, in the checking circuit, a full complement of one M32 and seven M21's is needed, only a single M10 is needed: the checking circuitry is therefore much less expensive than the operating multiplexing/ demultiplexing circuitry which requires one M32, one M23, seven M21s, seven M12s, 28 M10's and 28 M01's.

This arrangement is also used to monitor alarm conditions, some of which represent alarms outside the multiplexer/demultiplexer complex, others of which represent alarm signals being transported in the overhead portion of the DS1, DS2 and DS3 signals.

Microprocessor 100 has access to the alarm signals being received on the input demultiplexers and being transmitted on the output multiplexers. The alarm signals being inserted on the output multiplexers will be received in the DPA demultiplexers. Similarly, the input alarm signals received on the input demultiplexers will also be received in the DPA demultiplexer series. There is no reason, therefore, for these two types of multiplex alarm signals to differ except during the period when the M32 demultiplexer 112 frames up following a switch of inputs in selector 145 or when the M10 demultiplexer 133 frames up following a switch of inputs in the selector 130. Similarly, internally generated alarm signals in M01 135, 136 and M12 125, ..., 126 and M23 113 would be transmitted to DPA demultiplexer M32 112 and thereafter distributed. Again, there is no reason for these alarm signals to disagree for an extended period of time. However, internal failure generated alarm signals in M32 111, M21 121, ..., ..., 122 and M10 131, ..., 132 will not show up in the bit stream of the DPA demultiplexers M32 112, M21 123, ..., 124 and M10 133. If there is an extended period of disagreement of alarm signals, proper failure action (i.e., reporting the failure to a fault recovery program) is taken.

Figure 2:
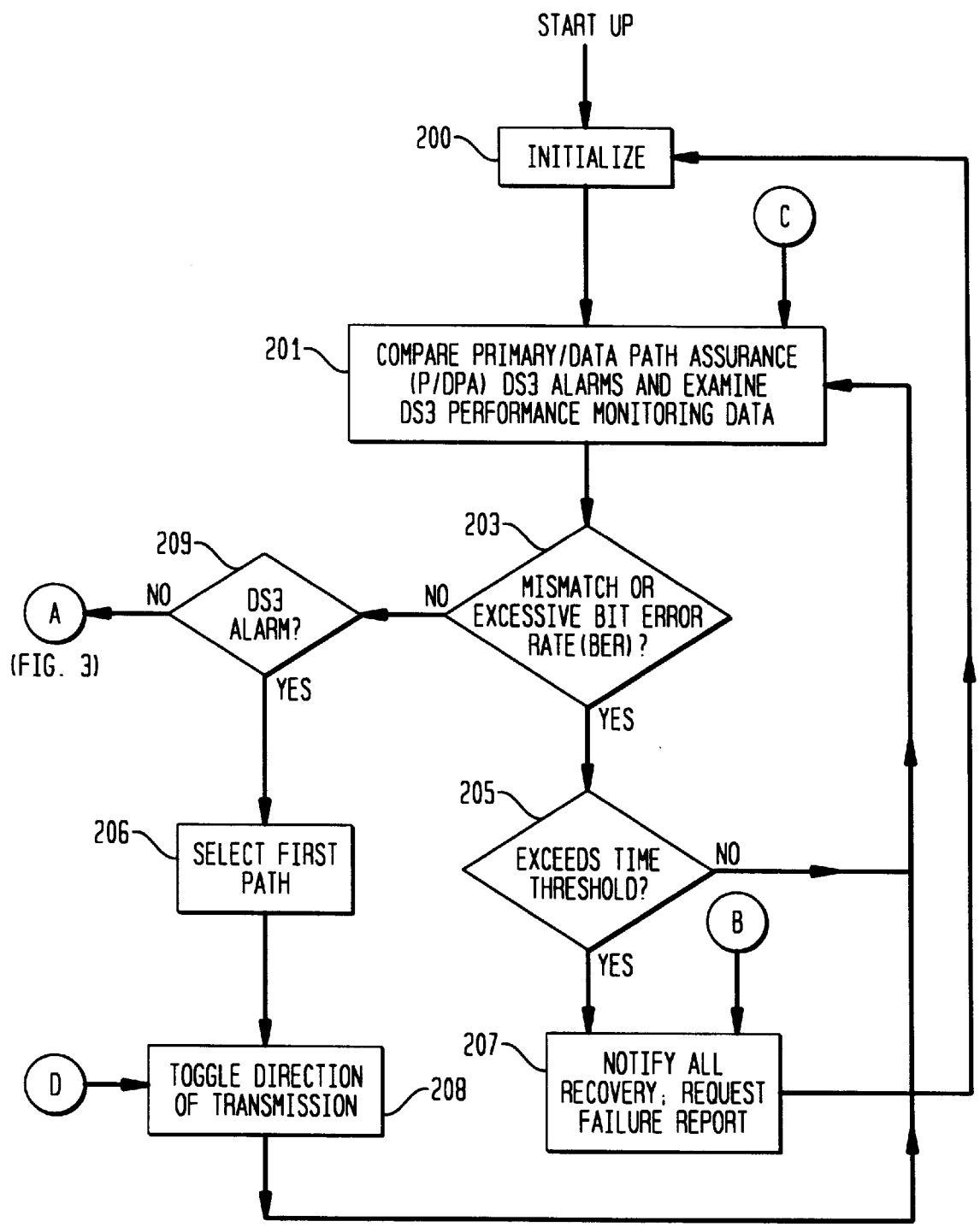
FIGS. 2 and 3 are flow diagrams illustrating the operation of applicants' invention.
Figure 3:
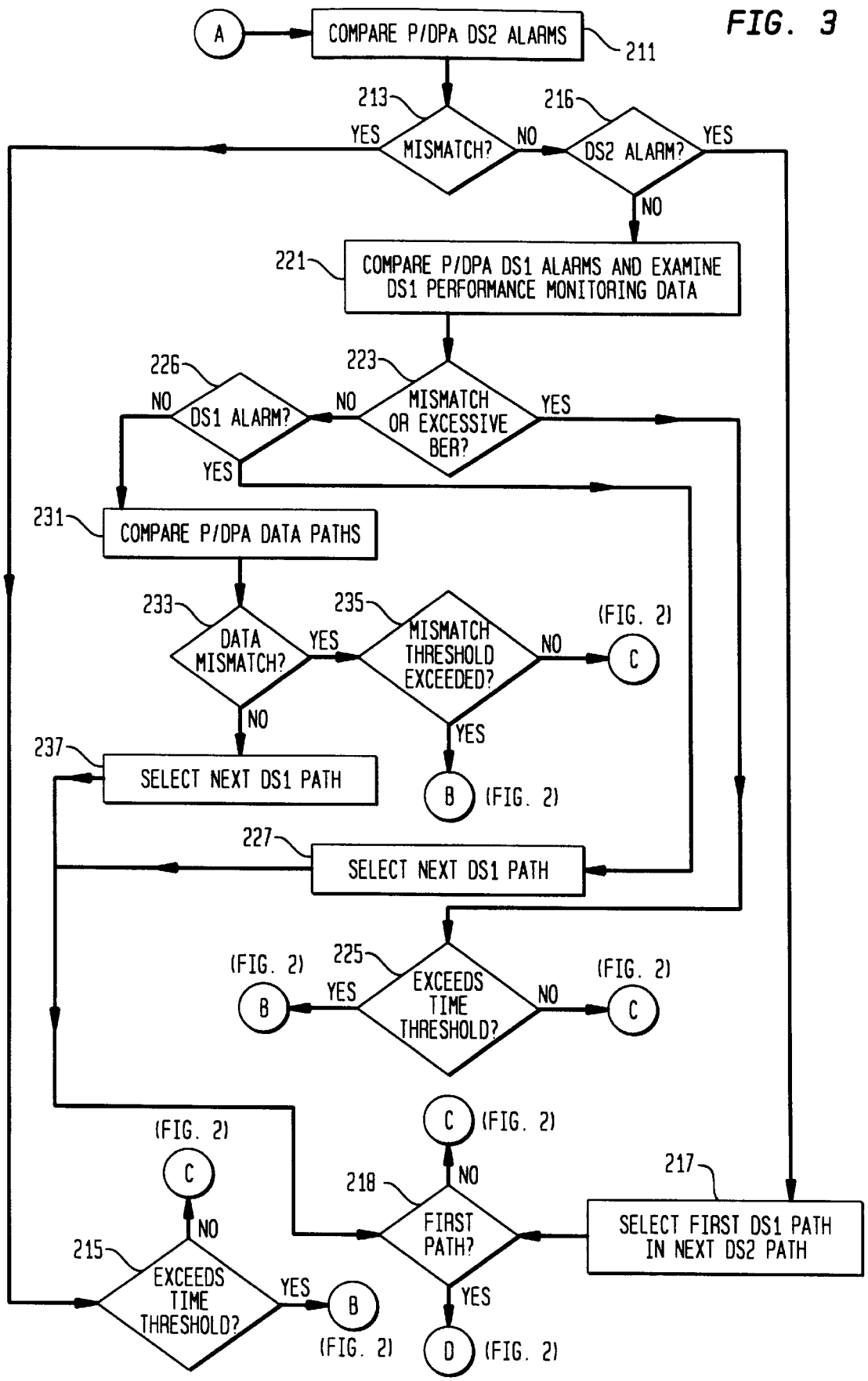

These alarm signals must be appropriately processed in order to prevent false conclusions from being drawn from the presence of a transient mismatch detected in match circuit 151 or 153. FIGS. 2 and 3 illustrate the overall process of testing the multiplexers taking into account the alarm signals. It is important to remember that the objective of these tests is to detect faults in the multiplexing hardware, not the transmission facilities hardware.

The software and hardware are first initialized so that testing may begin by matching the receive side of the first DS1 channel (action block 200, FIG. 2). Action block 200 is entered whenever a multiplexing unit is put into service or after a possible failure has been detected in action block 207, described hereinafter. The internal cycle begins in action block 201. First, the primary and DPA DS3 alarm states are compared and the DS3 performance monitoring data is also checked. Test 203 determines whether there is a mismatch between the alarm signals and also checks whether the primary DS3 performance monitoring data indicates a potential problem. If there is a mismatch or excessive bit error rate (BER), then test 205 determines whether the mismatch or the high bit error rate has remained for a sufficiently long period, i.e., whether a time threshold has been exceeded. If so, a failure report is generated (action block 207) and a fault recovery program (not shown) is notified; action block 200 is reentered. (If protection switching is required as determined by the fault recovery program, the unit is removed from service, replaced by the standby unit, and subjected to diagnostic tests.) If the time threshold has not been exceeded, then action block 201 is re-entered and after an appropriate time test 203 is repeated. If the results of test 203 is negative (i.e., no alarm mismatch and no excessive BER) before the time threshold has been exceeded, then test 209 is used to determine whether there is an alarm signal. The purpose of the loop of test 203, 205 and 201 is to allow transient differences in the alarm signals to be filtered out since such transient mismatches, if they do not persist too long, are legitimate events which cause temporary synchronizing problems between the primary and DPA multiplexer chains. Sources of these events are transient transmission problems and state changes in the selectors.

If the result of test 209 is an indication that there is an alarm, then there is no point in performing further tests on the multiplexing unit, but there is no need to report the alarm since a matched alarm indicates a transmission problem outside the multiplexers and demultiplexes, detected and reported elsewhere, as an external problem. In that case, action block 206 is executed and the first DS1 path of the DS3 group is selected. Action block 208 is then executed and the direction of transmission being checked is reversed (i.e., the state of selector 145 is toggled). Action block 201, previously described is then entered. The action following a negative result of test 209 (i.e., no DS3 alarms) are described with respect to FIG. 3. If there is no DS3 alarm indicated in test 209, then the primary/DPA alarm detectors of the DS2 multiplexer carrying the DS1 path currently being tested, are compared (action blocks 211 and test 213). If there is a mismatch in test 213, then test 215 determines if the time threshold for filtering out transient mismatches has been exceeded. If not, action block 201 is re-entered and the testing cycle for the present path is re-started. If the mismatch has persisted, indicating a trouble in the multiplexers, then a failure report is generated (action block 207, FIG. 2); and, as previously described, action block 200 is entered and the testing cycle is restarted. If within the allowed time the mismatch disappears and the "no" output of test 213 becomes active, then test 216 is used to determine whether a DS2 alarm signal has been found. If an active DS2 alarm is detected (positive output of test 216), then the first DS1 path of the next DS2 path is signal has an alarm state. Following execution of action block 217, test 218 determines whether the new path is the first DS1 path of the first DS2 path. If so, action block 208 (FIG. 2) is executed and the direction of transmission being checked is switched (i.e., the state of selector 145 is toggled) and action block 201 (FIG. 1) is then executed. If test 218 determines that the new path is not the first DS1 path of the first DS2 path, then action block 201 (FIG. 2) is executed.

If test 216 determines that there is no DS2 alarm state, then action block 221 is executed to compare the state of the primary and DPA DS1 alarm for the selected path and to check the primary DS1 performance monitoring data. Test 223 then determines if there is a mismatch in the DSI alarm signals or excessive bit errors on the primary DS1 path. If so, then test 225 determines whether the time threshold for allowable mismatches of the alarm signals has been exceeded. If the time threshold has been exceed, a failure report is generated (action block 207, FIG. 2), action block 200 (FIG. 2) is re-entered, and the test cycle is restarted. If the time threshold has not been exceeded, then action block 201 (FIG. 2) is executed and eventually test 223 and, if necessary, test 225 are repeated until there is either no mismatch or excessive bit error rate on the DS1 path or the time threshold is exceeded. If the mismatch has disappeared before the time threshold has been exceeded, then test 226 is used to determine whether DS1 alarm signals are present in the DS1 path under test. If so, then a comparison of the data on the primary and DPA data paths is avoided because it might lead to false failure reports, and so the next path is selected (action block 227); thereafter, test 218 and the subsequent actions for that test are performed. If there are no DS1 alarms in test 229, then the primary and DPA data signals (time slots) are matched (action block 231). The match here is only of the 24 channels of the DS1 signal and not of the framing bits which are checked by the framer and cyclic redundancy check (CRC) calculations of the demultiplexers. Further, if the DS1 signal carries channels that vary between 7 and 8 bits of data, (i.e., uses inband signaling) then only 7 bits per channel are matched. For E1 multiplexing, wherein some of the time slots are used for signaling, such time slots are not matched on the outgoing side.

Following the comparison, test 233 is used to determine if there is a mismatch. If not, then the next path is selected (action block 237); thereafter test 218 and subsequent actions are performed. If there is a mismatch, then test 235 is used to determine whether the mismatch level has exceeded a numerical threshold. If so, then a failure report is generated (action block 207 FIG. 2) is executed and action block 200 (FIG. 2) is executed to restart the test cycle. If the numerical threshold has not yet been exceeded, then action block 201 (FIG. 2) is reentered without advancing to the next DS1 path; thereafter action block 231 and mismatch test 233 are repeated.

In applicants' preferred embodiment, a stand-by unit is ready to replace any one of three active units. A unit includes both a primary circuit and a DPA circuit. An active unit can only be replaced by its associated stand-by unit. The configuration of the units depends on the particular application and format. An example of such different configurations is the use of a super frame generating super frame framing bits, or extended super frame which require that a different framing bit pattern be generated. Another example is the use of DS0 signals which do not use the full 8 bits on all samples, but have the 8 bit periodically used for passing supervisory signaling data. The match circuits 151 and 153 only match 7 bits if the DS0 signals do not use the full 8 bits on all samples. The framing bit is not compared in the match circuits. If there is a problem in generating correct framing bits, this will be reflected by the inability of the demultiplexer to frame up, or it will result in poor performance monitoring indications or alarms. In order to ensure that the stand-by unit is capable of replacing any of the three active units for which it is acting as a stand-by, the stand-by unit is operated in turn in each of the configurations of the three active units.

The above is a description of one preferred embodiment of applicants' invention. Many other embodiments will be apparent to those of ordinary skill in the art without departing from the scope of the invention. The invention is only limited by the attached claims.

We claim:

1. In a digital switching system for switching tiered multiplexed incoming pulse code modulation (PCM) signals to tiered multiplexed outgoing PCM signals, each for carrying a plurality of multiplexed PCM signals, said system comprising tiered demultiplexing apparatus for demultiplexing an incoming tiered PCM signal into a plurality of multiplexed PCM incoming signals, apparatus, external to said demultiplexing apparatus, for checking for proper operation of said demultiplexing apparatus, comprising:

means for converting a tiered multiplexed incoming PCM signal into a plurality of multiplexed PCM signals;

means for selecting one of said plurality of multiplexed PCM signals in said means for converting;

means for selecting a corresponding one multiplexed incoming signal from said demultiplexing apparatus; and means for matching said one of said plurality of multiplexed PCM signals of said means for converting with said corresponding multiplexed incoming signal of said demultiplexing apparatus.

2. The apparatus of claim 1, further comprising tiered multiplexing apparatus for multiplexing a plurality of outgoing PCM signals for transmission to another digital switching system;

means for connecting the outgoing tiered multiplexed PCM signal to said means for converting a tiered multiplexed incoming PCM signal for monitoring said outgoing tiered multiplexed PCM signal; and means for matching a corresponding one of said plurality of multiplexed PCM output signals with a selected one of said plurality of multiplexed PCM signals of said means for converting.

3. The apparatus of claim 2, wherein the tiered multiplexing apparatus and the tiered demultiplexing apparatus can operate in one of a plurality of configurations and wherein the apparatus for checking performs operations adapted for testing the configuration of the associated tiered multiplexing and tiered demultiplexing apparatus.

4. The apparatus of claim 1, wherein said means for matching successively matches sequential ones of said plurality of multiplexed PCM signals.

5. In a digital switching system for switching tiered multiplexed incoming pulse code modulation (PCM) signals to tiered multiplexed outgoing PCM signals, each for carrying a plurality of multiplexed PCM signals, said system comprising tiered demultiplexing apparatus for demultiplexing an incoming tiered PCM signal into a plurality of multiplexed PCM incoming signals, apparatus for checking for proper operation of said demultiplexing apparatus, comprising:

means for converting a tiered multiplexed incoming PCM signal into a plurality of multiplexed PCM signals;

means for selecting one of said plurality of multiplexed PCM signals in said means for converting;

means for selecting a corresponding one multiplexed incoming signal from said demultiplexing apparatus; and means for matching said one of said plurality of multiplexed PCM signals of said means for converting with said corresponding multiplexed incoming signal of said demultiplexing apparatus;

further comprising tiered multiplexing apparatus for multiplexing a plurality of outgoing PCM signals for transmission to another digital switching system;

means for connecting the outgoing tiered multiplexed PCM signal to said means for converting a tiered multiplexed incoming PCM signal for monitoring said outgoing tiered multiplexed PCM signal; and means for matching a corresponding one of said plurality of multiplexed PCM output signals with a selected one of said plurality of multiplexed PCM signals of said means for converting;

further comprising means for comparing alarm signals of said tiered multiplexed PCM incoming and outgoing signals with alarm signals of said means for converting and said means for selecting.

6. In a digital switching system for switching tiered multiplexed incoming pulse code modulation (PCM) signals to tiered multiplexed outgoing PCM signals, each for carrying a plurality of multiplexed PCM signals, said system comprising tiered demultiplexing apparatus for demultiplexing an incoming tiered PCM signal into a plurality of multiplexed PCM incoming signals, apparatus for checking for proper operation of said demultiplexing apparatus, comprising:

means for converting a tiered multiplexed incoming PCM signal into a plurality of multiplexed PCM signals;

means for selecting one of said plurality of multiplexed PCM signals in said means for converting;

means for selecting a corresponding one multiplexed incoming signal from said demultiplexing apparatus; and means for matching said one of said plurality of multiplexed PCM signals of said means for converting with said corresponding multiplexed incoming signal of said demultiplexing apparatus;

wherein said tiered multiplexed incoming PCM signals comprise DS3 signals;

wherein said means for converting comprises a DS3 demultiplexer, a plurality of DS2 demultiplexers, and a single DS1 demultiplexer;

wherein said means for selecting comprises means for selecting one of a plurality of DS1 PCM streams.

7. In a digital switching system for switching tiered multiplexed incoming pulse code modulation (PCM) signals to tiered multiplexed outgoing PCM signals, each for carrying a plurality of multiplexed PCM signals, said system comprising tiered demultiplexing apparatus for demultiplexing an incoming tiered PCM signal into a plurality of multiplexed PCM incoming signals, apparatus for checking for proper operation of said demultiplexing apparatus, comprising:

means for converting a tiered multiplexed incoming PCM signal into a plurality of multiplexed PCM signals;

means for selecting one of said plurality of multiplexed PCM signals in said means for converting;

means for selecting a corresponding one multiplexed incoming signal from said demultiplexing apparatus; and means for matching said one of said plurality of multiplexed PCM signals of said means for converting with said corresponding multiplexed incoming signal of said demultiplexing apparatus;

further comprising tiered multiplexing apparatus for multiplexing a plurality of outgoing PCM signals for transmission to another digital switching system;

means for connecting the outgoing tiered multiplexed PCM signal to said means for converting a tiered multiplexed incoming PCM signal for monitoring said outgoing tiered multiplexed PCM signal; and means for matching a corresponding one of said plurality of multiplexed PCM output signals with a selected one of said plurality of multiplexed PCM signals of said means for converting;

wherein the tiered multiplexing apparatus and the tiered demultiplexing apparatus can operate in one of a plurality of configurations; and wherein the apparatus for checking performs operations adapted for testing the configuration of the associated tiered multiplexing and tiered demultiplexing apparatus;

wherein said means for matching comprises means for matching only time slots of the selected demultiplexed PCM signal.

8. The apparatus of claim 7, wherein said means for matching comprises means for matching only a subset of each time slot if said multiplexed PCM signal is a signal carrying signaling data in at least one bit of some of said time slots.

9. In a digital switching system for switching tiered multiplexed incoming pulse code modulation (PCM) signals to tiered multiplexed outgoing PCM signals, each for carrying a plurality of multiplexed PCM signals, said system comprising tiered demultiplexing apparatus for demultiplexing an incoming tiered PCM signal into a plurality of multiplexed PCM incoming signals, apparatus for checking for proper operation of said demultiplexing apparatus, comprising:

means for converting a tiered multiplexed incoming PCM signal into a plurality of multiplexed PCM signals;

means for selecting one of said plurality of multiplexed PCM signals in said means for converting;

means for selecting a corresponding one multiplexed incoming signal from said demultiplexing apparatus; and means for matching said one of said plurality of multiplexed PCM signals of said means for converting with said corresponding multiplexed incoming signal of said demultiplexing apparatus;

further comprising tiered multiplexing apparatus for multiplexing a plurality of outgoing PCM signals for transmission to another digital switching system;

means for connecting the outgoing tiered multiplexed PCM signal to said means for converting a tiered multiplexed incoming PCM signal for monitoring said outgoing tiered multiplexed PCM signal; and means for matching a corresponding one of said plurality of multiplexed PCM output signals with a selected one of said plurality of multiplexed PCM signals of said means for converting;

wherein the tiered multiplexing apparatus and the tiered demultiplexing apparatus can operate in one of a plurality of configurations; and wherein the apparatus for checking performs operations adapted for testing the configuration of the associated tiered multiplexing and tiered demultiplexing apparatus;

wherein said tiered demultiplexing apparatus and said tiered multiplexing apparatus is used as a spare unit for a plurality of working units;

wherein said plurality of working units operate in a plurality of different configurations, and wherein the apparatus for checking successively performs operations adapted for testing said plurality of different configurations.

10. In a digital switching system for switching tiered multiplexed incoming pulse code modulation (PCM) signals to tiered multiplexed outgoing PCM signals, each for carrying a plurality of multiplexed PCM signals, said system comprising tiered demultiplexing apparatus for demultiplexing an incoming tiered PCM signal into a plurality of multiplexed PCM incoming signals, apparatus for checking for proper operation of said demultiplexing apparatus, comprising:

means for converting a tiered multiplexed incoming PCM signal into a plurality of multiplexed PCM signals;

means for selecting one of said plurality of multiplexed PCM signals in said means for converting;

means for selecting a corresponding one multiplexed incoming signal from said demultiplexing apparatus; and means for matching said one of said plurality of multiplexed PCM signals of said means for converting with said corresponding multiplexed incoming signal of said demultiplexing apparatus;

further comprising tiered multiplexing apparatus for multiplexing a plurality of outgoing PCM signals for transmission to another digital switching system;

means for connecting the outgoing tiered multiplexed PCM signal to said means for converting a tiered multiplexed incoming PCM signal for monitoring said outgoing tiered multiplexed PCM signal; and means for matching a corresponding one of said plurality of multiplexed PCM output signals with a selected one of said plurality of multiplexed PCM signals of said means for converting;

wherein the tiered multiplexing apparatus and the tiered demultiplexing apparatus can operate in one of a plurality of configurations; and wherein the apparatus for checking performs operations adapted for testing the configuration of the associated tiered multiplexing and tiered demultiplexing apparatus;

wherein said means for matching comprises means for avoiding the matching of some of the time slots on the outgoing side when such time slots are used for signaling.

* * * * *